(12) United States Patent
Bendahan et al.

(10) Patent No.: US 10,754,057 B2
(45) Date of Patent: Aug. 25, 2020

(54) SYSTEMS AND METHODS FOR IMPROVING PENETRATION OF RADIOGRAPHIC SCANNERS

(71) Applicant: Rapiscan Systems, Inc., Torrance, CA (US)

(72) Inventors: Joseph Bendahan, San Jose, CA (US); James Ollier, Huyton (GB)

(73) Assignee: Rapiscan Systems, Inc., Torrance, CA (US)

( * ) Notice: Subject to any disclaimer, the term of this patent is extended or adjusted under 35 U.S.C. 154(b) by 428 days.

(21) Appl. No.: 15/648,724

(22) Filed: Jul. 13, 2017

(65) Prior Publication Data

US 2018/0017702 A1 Jan. 18, 2018

Related U.S. Application Data

(60) Provisional application No. 62/362,585, filed on Jul. 14, 2016.

(51) Int. Cl.
*G01V 5/00* (2006.01)
*G21K 1/04* (2006.01)

(52) U.S. Cl.
CPC .......... *G01V 5/0041* (2013.01); *G01V 5/0016* (2013.01); *G21K 1/04* (2013.01); *G21K 1/043* (2013.01)

(58) Field of Classification Search
CPC .... G01V 5/0041; G01V 5/0016; G21K 1/043; G21K 1/04
See application file for complete search history.

(56) References Cited

U.S. PATENT DOCUMENTS

| | | | |
|---|---|---|---|
| 3,919,467 A | 11/1975 | Peugeot |
| 4,190,773 A | 2/1980 | Braden |
| 4,266,135 A | 5/1981 | Kuwik |
| 4,304,999 A | 12/1981 | Richey |
| 4,773,087 A | 9/1988 | Plewes |
| 4,831,260 A | 5/1989 | Dibianca |

(Continued)

FOREIGN PATENT DOCUMENTS

| | | |
|---|---|---|
| EP | 0417965 | 3/1991 |
| EP | 0417965 A2 | 3/1991 |

(Continued)

OTHER PUBLICATIONS

International Search Report for PCT/US17/41853, dated Dec. 18, 2017.

(Continued)

*Primary Examiner* — Christine S. Kim
(74) *Attorney, Agent, or Firm* — Novel IP

(57) ABSTRACT

Systems and methods are used to increase the penetration and reduce the exclusion zone of radiographic systems. An X-ray detection method irradiates an object with X-ray fanlets including vertically moving fan beams, each fanlet having an angular range smaller than the angular coverage of the object. The fanlets are produced by modulating an X-ray beam, synchronizing the X-ray beam and the fanlets, detecting the fanlets irradiating the object, collecting image slices from the detector array corresponding to a complete scan cycle of the fanlets, and processing the image slices collected for combining into a composite image.

19 Claims, 10 Drawing Sheets

(56) References Cited

U.S. PATENT DOCUMENTS

| | | |
|---|---|---|
| 4,998,270 A | 3/1991 | Scheid |
| 5,040,199 A | 8/1991 | Stein |
| 5,262,946 A | 11/1993 | Heuscher |
| 5,319,696 A | 6/1994 | Abdel-Malek |
| 5,321,271 A | 6/1994 | Schonberg |
| 5,418,372 A | 5/1995 | Schonberg |
| 5,661,377 A | 8/1997 | Mishin |
| 5,748,705 A | 5/1998 | Stein |
| 5,838,759 A | 11/1998 | Armistead |
| 5,909,478 A | 6/1999 | Polichar |
| 5,949,811 A | 9/1999 | Baba |
| 5,974,111 A | 10/1999 | Krug |
| 6,058,158 A | 5/2000 | Eiler |
| 6,215,853 B1 * | 4/2001 | Kump ............... A61B 6/06 378/147 |
| 6,272,206 B1 | 8/2001 | Bjorkholm |
| 6,438,201 B1 | 8/2002 | Mazess |
| 6,453,007 B2 | 9/2002 | Adams |
| 6,459,761 B1 | 10/2002 | Grodzins |
| 6,504,898 B1 | 1/2003 | Kotler |
| 6,507,027 B1 | 1/2003 | Kojima |
| 6,628,745 B1 * | 9/2003 | Annis ............... A61B 6/032 378/10 |
| 6,713,773 B1 | 3/2004 | Lyons |
| 6,714,620 B2 | 3/2004 | Caflisch |
| 7,010,094 B2 | 3/2006 | Grodzins |
| 7,272,208 B2 | 9/2007 | Yatsenko |
| 7,372,944 B2 | 5/2008 | Bernhardt |
| 7,391,849 B2 | 6/2008 | Smith |
| 7,453,987 B1 * | 11/2008 | Richardson ......... G01V 5/0041 378/57 |
| 7,526,064 B2 | 4/2009 | Akery |
| 7,538,325 B2 | 5/2009 | Mishin |
| 7,709,818 B2 | 5/2010 | Matsuda |
| 7,734,007 B2 * | 6/2010 | Kargar ............... A61B 6/06 378/196 |
| 7,860,213 B2 * | 12/2010 | Akery ............... G01N 23/04 378/198 |
| 8,054,937 B2 | 11/2011 | Langeveld |
| 8,170,177 B2 | 5/2012 | Akery |
| 8,437,448 B2 | 5/2013 | Langeveld |
| 8,457,275 B2 | 6/2013 | Akery |
| 8,576,989 B2 | 11/2013 | Kaminski |
| 8,693,628 B2 * | 4/2014 | Machan ............. A61B 6/06 378/160 |
| 8,781,067 B2 | 7/2014 | Langeveld |
| 8,837,670 B2 | 9/2014 | Akery |
| 8,903,046 B2 | 12/2014 | Morton |
| 9,020,103 B2 | 4/2015 | Grodzins |
| 9,058,909 B2 | 6/2015 | Kaminski |
| 9,218,933 B2 | 12/2015 | Langeveld |
| 9,279,901 B2 | 3/2016 | Akery |
| 9,632,205 B2 | 4/2017 | Morton |
| 9,857,317 B2 * | 1/2018 | Tang ............... G01N 23/043 |
| 10,228,487 B2 * | 3/2019 | Mastronardi ........ G01V 5/0008 |
| 10,408,967 B2 | 9/2019 | Morton |
| 2003/0016790 A1 | 1/2003 | Grodzins |
| 2003/0035510 A1 | 2/2003 | Strommer |
| 2005/0117683 A1 | 6/2005 | Mishin |
| 2005/0123101 A1 | 6/2005 | Akutsu |
| 2006/0126772 A1 | 6/2006 | Hu |
| 2006/0126792 A1 | 6/2006 | Li |
| 2006/0182221 A1 | 8/2006 | Bernhardt |
| 2006/0249685 A1 | 11/2006 | Tanaka |
| 2007/0140423 A1 | 6/2007 | Foland |
| 2007/0147585 A1 | 6/2007 | Eilbert |
| 2007/0269013 A1 | 11/2007 | Liu |
| 2008/0198970 A1 | 8/2008 | Kirshner |
| 2008/0211431 A1 | 9/2008 | Mishin |
| 2009/0001295 A1 * | 1/2009 | Johnsen ............. G21K 1/04 250/505.1 |
| 2009/0001296 A1 | 1/2009 | Kuduvalli |
| 2009/0154650 A1 | 6/2009 | Tanabe |
| 2009/0257555 A1 | 10/2009 | Chalmers |
| 2010/0020937 A1 | 1/2010 | Hautmann |
| 2010/0034355 A1 | 2/2010 | Langeveld |
| 2010/0072405 A1 | 3/2010 | Yu |
| 2010/0177868 A1 | 7/2010 | Smith |
| 2010/0277312 A1 * | 11/2010 | Edic ............... G01V 5/0025 340/540 |
| 2011/0019797 A1 | 1/2011 | Morton |
| 2012/0257710 A1 | 10/2012 | Funk |
| 2013/0039472 A1 * | 2/2013 | Morton ............. G01V 5/0041 378/88 |
| 2013/0170611 A1 | 7/2013 | Beckmann |
| 2013/0230145 A1 | 9/2013 | Slatkin |
| 2014/0153699 A1 * | 6/2014 | Kaminski ........... G21K 1/043 378/160 |
| 2014/0233707 A1 * | 8/2014 | Grodzins ........... G21K 1/046 378/146 |
| 2015/0110250 A1 | 4/2015 | Gray |
| 2015/0139386 A1 * | 5/2015 | Star-Lack ......... G01V 5/0016 378/57 |
| 2015/0355369 A1 | 12/2015 | Morton |

FOREIGN PATENT DOCUMENTS

| | | |
|---|---|---|
| EP | 1642529 A1 | 4/2006 |
| JP | 2000262512 | 9/2000 |
| JP | 2002014059 | 1/2002 |
| JP | 2005124975 | 5/2005 |
| JP | 2005149762 | 6/2005 |
| JP | 2007093501 | 4/2007 |
| WO | 0033060 A2 | 6/2000 |
| WO | 0159485 A1 | 8/2001 |
| WO | 2006000020 A1 | 1/2006 |
| WO | 2006053279 A2 | 5/2006 |
| WO | 2009000020 A1 | 12/2008 |
| WO | 2009027667 A2 | 3/2009 |
| WO | 2009137698 | 11/2009 |
| WO | 2010019311 | 2/2010 |
| WO | 2011095810 | 8/2011 |
| WO | 2011095810 A2 | 8/2011 |

OTHER PUBLICATIONS

"Oral Program of SORMA West 2008", Jun. 5, 2008, pp. 1-95, XP055167963, Retrieved from the Internet: URL: http://www2.lbl.gov/conferences/SORMA/assets/doc/SORMAOralProgram30May.pdf.

Langeveld et al.: "Intensity-modulated Advanced X-ray Source (IMAXS) for Homeland Security Applications", IEEE Transactions on Nuclear Science, vol. 56, No. 3, Jun. 2009.

* cited by examiner

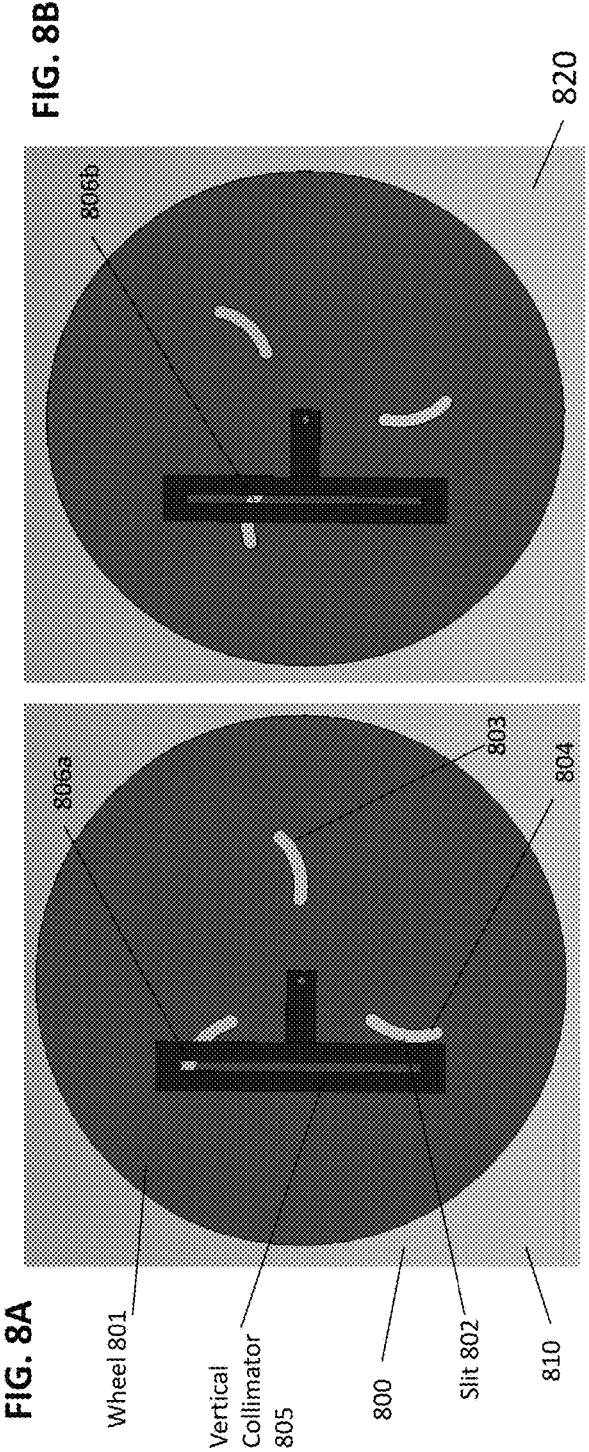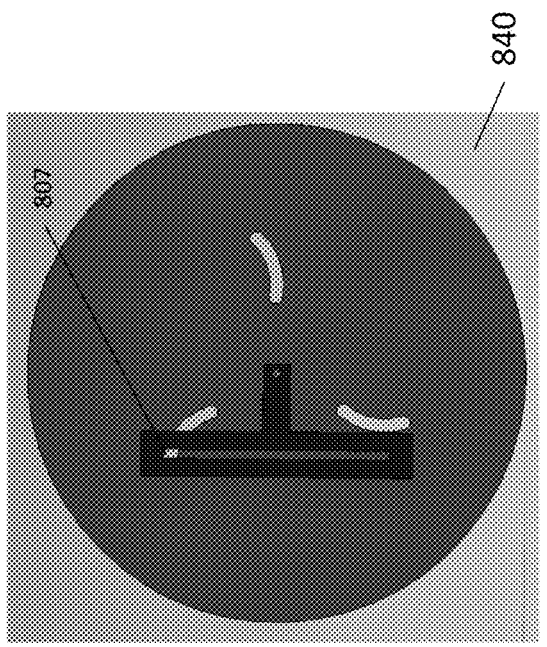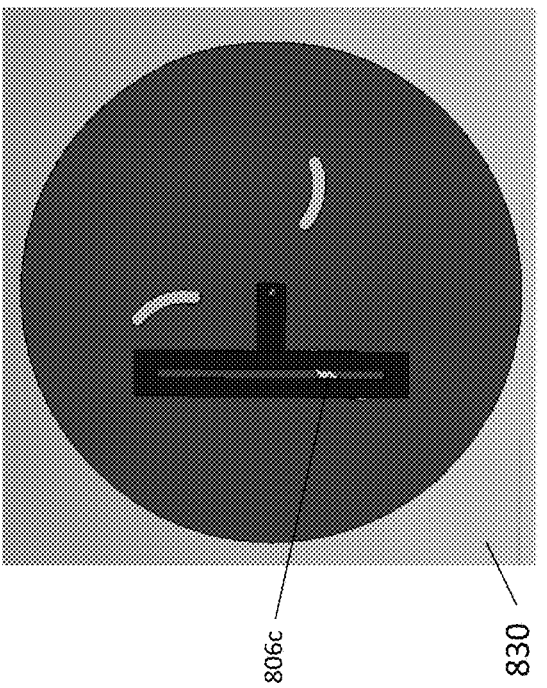
FIG. 8A  FIG. 8B  FIG. 8C  FIG. 8D

SYSTEMS AND METHODS FOR IMPROVING PENETRATION OF RADIOGRAPHIC SCANNERS

CROSS-REFERENCE

The present specification relies on, for priority, U.S. Patent Provisional Application No. 62/362,585, entitled "Systems and Methods for Improving Penetration of Radiographic Scanners", and filed on Jul. 14, 2016.

The above-mentioned applications are herein incorporated by reference in their entirety.

FIELD

The present specification is related to radiographic systems. More specifically the present specification is related to a method of increasing penetration of radiographic systems and reducing exclusion zones.

BACKGROUND

X-ray imaging is one of the most common methods used for detecting contraband in cargo. However, during the inspection of large containers, as a result of inadequate penetration by the radiation, it is common for traditional X-ray systems to produce images with dark areas. These dark areas might be indicative of the presence of threat materials; however, they yield little information about the exact nature of threat. Typical penetration depths of existing cargo inspection systems range between 200 and 400 mm of iron.

While it is known that systems with higher penetration can be obtained with high-power sources, using a higher power source increases the size and footprint of the radiation exclusion zone, limiting wide deployment of such systems. Thus, the use of high-energy X-rays for cargo inspection is not without some tradeoff. On one hand, the source needs to produce high-intensity, high-energy X-ray beams in order to provide high imaging penetration of the cargo. On the other hand, higher X-ray intensities/energies lead to larger radiation footprint, requiring a larger controlled area (exclusion zone), or more shielding around the system. This may also lead to higher radiation dosage to cargo, and in the case of portal systems, to the driver of the cargo as well.

When the exclusion zone is not limited or a shielded building is provided to limit the size of the system, the increase of penetration depth begins to taper down as the source intensity is increased, until it reaches a point when larger intensities of the X-ray source do not cause an increase in the penetration depth of the X-rays. The main effect that limits the highest achievable penetration depth is scatter, which represents a background added to the transmitted signal. X-rays from the shaped fan beam scatter from the container walls and cargo and produce a low-frequency background that adds to the transmitted image, effectively reducing contrast, thereby limiting penetration. The intensity of the scatter depends on the number of X-rays impinging on the object being scanned. Longer and wider fan beams produce more scatter than shorter and narrower fans, approximately proportional to the ratio of the irradiation areas. The transmitted signal received at the detectors is thus polluted from X-rays scattering from other parts of the object being inspected. Hence, there is a need to reduce the scatter further to increase X-ray penetration.

The most common approach to reduce scatter is to use collimators in conjunction with the detectors. However, deep, heavy and expensive collimators are needed for obtaining desired penetration. In addition, the scatter rejection is only reduced partially, as a collimator itself becomes a source of scatter.

Other existing methods to reduce the measured scatter radiation consist of employing Cerenkov detectors that intrinsically are not sensitive to low-energy X-rays, which is characteristic of the scatter radiation. However, these Cerenkov and energy-sensitive detectors are more complex and expensive than standard X-ray detectors and typically do not enable improved intensity modulation. Also, when the source intensity is increased, these detectors start saturating due to the very high count rate. Still other methods are based on measuring the energy spectrum of the radiation and removing the low-energy signals.

Currently available X-ray sources usually have a single fixed intensity setting that is set to the output level requested by the customer, which is typically the highest setting that still complies with a required radiation footprint. Moreover, during a typical scan, source output is often much higher than needed to achieve sufficient imaging penetration; not just from one vehicle or container to the next, but also within the cargo of the same vehicle or container. Hence, there is a need to increase X-ray intensity in order to increase penetration without increasing the exclusion zone and/or radiation dosage.

Current methods for increasing penetration are based on beam-modulating intensity based on the highest attenuation measured in the previous slice. However, the beam intensity along the slice may be higher than required due to the high attenuation of a small area of the object. The higher intensity results in a larger exclusion zone, or if limited, in a reduction of the source strength that results in lower penetration.

PCT Publication Number WO2011095810A3, assigned to the Applicant of the present specification discloses "[a] scanner system comprising a radiation generator arranged to generate radiation to irradiate an object, detection means arranged to detect the radiation after it has interacted with the object and generate a sequence of detector data sets as the object is moved relative to the generator, and processing means arranged to process each of the detector data sets thereby to generate a control output arranged to control the radiation generator to vary its radiation output as the object is scanned." There is still a need, however, for more fine control to modulate the intensity as a function of vertical positions within the slice to further optimize the intensity imparted to the object. The WO2011095810 publication is incorporated herein by reference in its entirety.

In addition, U.S. Pat. No. 9,218,933, also assigned to the Applicant of the present specification, discloses "[a]n X-ray source for scanning an object comprising: an electron beam generator, wherein said electron beam generator generates an electron beam; an accelerator for accelerating said electron beam in a first direction; and, a first set of magnetic elements for transporting said electron beam into a magnetic field created by a second set of magnetic elements, wherein the magnetic field created by said second set of magnetic elements causes said electron beam to strike a target such that the target substantially only generates X-rays focused toward a high density area in the scanned object". What is still needed, however, is a system that does not require complex electron-transport components. The '933 patent is incorporated herein by reference in its entirety.

Even when a system has very high penetration, there may be dark alarms that require labor-intensive manual inspection for clearing. There is a need for reducing the dark alarm rate further to reduce manual inspections.

Therefore, there is a need for scanning systems with increased penetration and smaller exclusion zones, resulting in improved performance and lower alarm rates and easy deployment in a wide range of environments.

SUMMARY

In some embodiments, the present specification discloses an X-ray detection system with increased penetration comprising: an X-ray source for projecting an X-ray beam towards an object; a mechanism for producing one or more fanlets from the X-ray beam, each fanlet comprising a vertically moving fan beam having an angular range smaller than the angular coverage of the object; a detector array for detecting the fanlets projected on the object; a controller for synchronizing the X-ray source and the mechanism, and collecting image slices from the detector array corresponding to the fanlets; and a processing unit for combining the image slices collected into a composite image.

In some embodiments, the present specification discloses an X-ray detection system configured to provide for increased penetration of an object, comprising: an X-ray source for generating an X-ray beam in an inspection volume; a conveyor for moving the object through the inspection volume; a collimator positioned between the X-ray source and the object, wherein the collimator is configured to receive the X-ray beam and produce one or more fanlets from the X-ray beam, wherein each fanlet comprises a vertically moving fan beam having an angular range greater than 1 degree but smaller than the angular coverage of the object; a detector array opposing said X-ray source and positioned within the inspection volume for detecting the one or more fanlets projected on the object; a controller configured to synchronize the X-ray source and the collimator and collect image slices from the detector array corresponding to each of the one more fanlets; and a processing unit for combining the image slices collected into a composite image.

Optionally, the X-ray source is a pulsed X-ray source.

Optionally, the X-ray source produces dual-energy beams. Still optionally, the dual-energy beams are interlaced.

Optionally, the X-ray source produces X-ray pulses comprising low and high energy X-ray beams separated in time.

Optionally, the controller is configured to control the conveyor such that a total time for the one or more fanlets multiplied by a rate of speed of the conveyor is equal to or less than a width of a detector in the detector array.

Optionally, the collimator is configured to generate an overlap between the one or more fanlets of approximately 1 degree with respect to the object.

Optionally, the X-ray source is a CW X-ray source.

Optionally, the collimator for producing the one or more fanlets comprises a plurality of controlled fast actuators coupled with beam attenuators to shape the X-ray beam.

Optionally, the collimator for producing the one or more fanlets comprises a beam chopper.

Optionally, the collimator for producing the one or more fanlets comprises a rotating wheel with slits designed to produce the vertically moving one or more fanlets.

In some embodiments, the present specification is directed toward an X-ray detection method comprising: irradiating an object with more than one X-ray fanlet, wherein each X-ray fanlet comprises a vertically moving fan beam having an angular range greater than 1 degree but smaller than the angular coverage of the object and wherein each X-ray fanlet is produced by using a collimator for collimating an X-ray beam generated by an X-ray source; synchronizing the X-ray beam and the more than one fanlet; detecting the more than one fanlet irradiating the object; collecting image slices from the detector array corresponding to a complete scan cycle of the more than one fanlet; and processing the image slices and combining the image slices into a composite image.

Optionally, the method further comprises adjusting a beam intensity and energy of each of the more than one fanlets based on signals detected from a previous fanlet at a same vertical position with respect to the object to generate a control output, wherein the control output is used to control the X-ray detection method.

Optionally, the X-ray source is a pulsed X-ray source.

Optionally, the X-ray source produces dual-energy beams.

Optionally, the dual-energy beams are interlaced.

Optionally, the X-ray source produces X-ray pulses comprising low and high energy X-ray beams separated in time.

Optionally, the collimator is configured to generate an overlap between the one or more fanlets at every position with respect to a surface area of the object.

Optionally, the collimator comprises a spinning cylinder with a helical aperture.

Optionally, the collimator comprises a plurality of controlled fast actuators coupled with beam attenuators to shape the X-ray beam.

Optionally, an energy of each of the more than one fanlet is adjusted at a same fanlet location in a following cycle to allow for interlaced dual-energy scanning of every vertical position.

Optionally, the X-ray source is a CW X-ray source.

In some embodiments, the present specification discloses a method for operating a scanning system, wherein said scanning system comprises an X-ray source, an array of detectors, and a processor to process and analyze image data, the method comprising: generating a first X-ray beam in order to conduct a first scan to produce an image of the object being scanned; determining areas in said image data that require a more detailed inspection; configuring a collimator to limit a second X-ray beam such that, upon emission of the second X-ray beam, the collimator emits a plurality of fanlets, wherein each fanlet has an angular range that is less than an angular range covering an object but greater than 1 degree; and moving the object relative to the X-ray source and the array of detectors to perform a second scan on the areas.

Optionally, said areas represent a lack of penetration by the first X-ray beam during said first scan.

Optionally, said areas represent items of interest or alarm such as explosive, firearms, drugs or contraband.

Optionally, the X-ray source and array of detectors are mounted on a gantry.

Optionally, the collimator comprises a plurality of controlled actuators coupled with beam attenuators to shape the second X-ray beam.

Optionally, the collimator comprises two vertically controlled attenuators to inspect only said areas.

Optionally, a scan of said areas using said plurality of fanlets is performed at a lower speed compared to a speed of a scan using the first X-ray beam.

Optionally, the method further comprises replacing the areas generated by a scan using a first X-ray beam with images of the areas generated by a scan using the plurality of fanlets.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings:

FIG. 8A illustrates an exemplary mechanism for generating moving fanlets, in a first position, according to an alternate embodiment of the present specification;

FIG. 8B illustrates an exemplary mechanism for generating moving fanlets, in a second position, according to an alternate embodiment of the present specification;

FIG. 8C illustrates an exemplary mechanism for generating moving fanlets, in a third position, according to an alternate embodiment of the present specification;

FIG. 8D illustrates an exemplary mechanism for generating moving fanlets, in a fourth position, according to an alternate embodiment of the present specification; and, FIG. 9 is a flow chart that describes scanning steps of the imaging system of the present specification, in accordance with embodiments.

DETAILED DESCRIPTION

Figure 1:
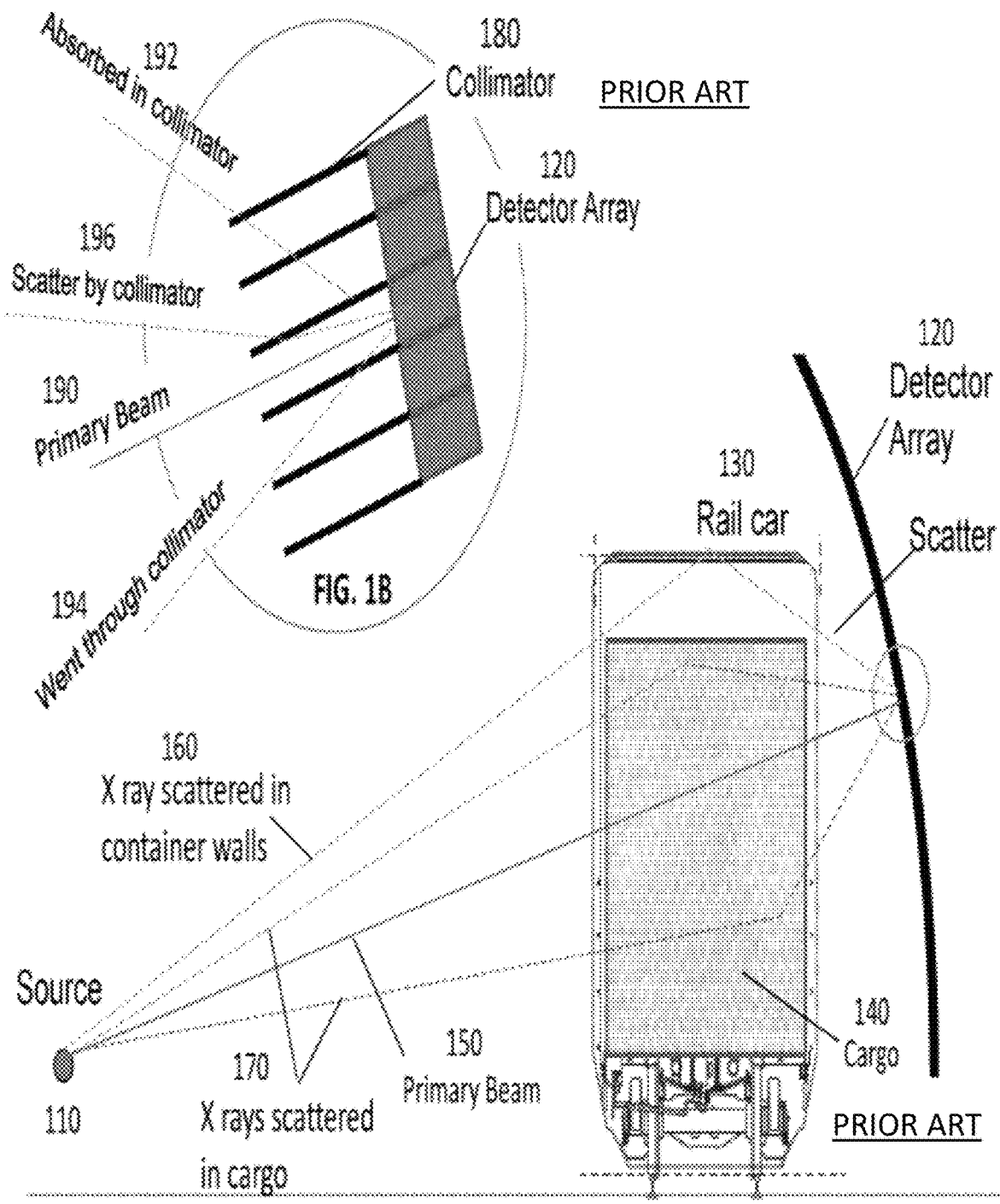
FIG. 1A illustrates a conventional X-ray system for scanning cargo showing a plurality of possible X-ray paths.
FIG. 1B illustrates an exemplary detector, with a collimator, showing a plurality of possible X-ray paths.

The present specification describes scanning systems having increased penetration capability and smaller exclusion zones, resulting in improved performance and easy deployment in a wide range of environments. Embodiments of the present specification are well-suited for applications in environments including, but not limited to, container, truck and railcar inspection. Some embodiments of the present specification are particularly well-suited for use in inspecting slow-moving vehicles.

The present specification is directed towards systems and methods for both reducing the exclusion zone and increasing the penetration capability of radiographic systems, such as X-ray scanners. In an embodiment, the imaging system described in the present specification enables the scanning of high density cargo with a sufficient penetration depth for the detection of contraband resulting in a low probability of dark alarms that may require a secondary inspection. The present specification also describes an imaging system having a lower impact from scatter radiation that is observed in conventional X-ray scanners and that can be used for inspecting high-density cargo. The present specification also describes a novel method that allows for optimization of the radiation intensity imparted to cargo and environment, which further increases penetration.

In an embodiment, the present specification describes a novel mechanism for reducing scatter by producing a vertically moving fan beam with an angular range smaller than the angular coverage of the object being scanned. The present specification provides a vertically moving fan beam or "fanlet" synchronized with a pulsed X-ray source and a data acquisition system. In an embodiment, the "fanlet" represents a portion of the total overall fan beam, and is vertically translated to cover the extent of the object.

In an embodiment, a vertical collimator projects a fanlet having an angular range smaller than the angular coverage of the object being scanned. In an embodiment, the angular range is achieved by using a collimator having dimensional characteristics that are independent of the object, but that are tailored to insure the highest and widest possible object dimensions are accounted for. In an embodiment, the collimator is designed to provide collimation for a predefined object height and object width, which are larger than a standard object height and width, thereby insuring no portion of the object remains unscanned.

The fanlet, via collimator mechanics, is translated vertically to cover the angular spread of the object. A pulsed linac X-ray source and a data acquisition system are synchronized with the moving collimator in such a way that the image of the object is acquired at intervals, where in one cycle the fanlets cover a slice of the object with no gaps and, optionally, a minimal overlap. The image from each fanlet is then combined to produce a slice image. In one embodiment, to minimize the effect of object motion, the source pulsing frequency is increased by the number of fanlets. The advantage of this embodiment is that the scatter is reduced as the irradiated area is reduced in each acquisition.

The present specification is also directed towards reducing the radiation exclusion zone. In additional embodiments, the signals from each fanlet are used to control the intensity of the fanlet for the following cycle, to optimize the source intensity. In an embodiment, the beam intensity and/or energy is modulated based on the transmission observed in each fanlet to expose the object to the minimum intensity required for penetration, while at the same time reducing the dose to cargo and the environment resulting in a smaller exclusion zone. This is similar to the intensity modulation described in PCT Publication Number WO 2011095810A, incorporated herein by reference in its entirety, which is applied to the full fan beam.

The embodiments described herein may be employed for dual-energy scanning as well, since the time between pulses at the same vertical location is the same as in a standard system because the pulsing rate is increased accordingly. However, for fast moving objects, the pulsing frequency is high and it might not be possible to increase the pulsing frequency by a factor of two or three. In these applications, the preferred embodiment is to use a pulsed source, where each pulse contains dual energies separated by a short time.

In another embodiment, a Continuous Wave (CW) source is used. In this embodiment, the data acquisition system collects data continuously at a plurality of time intervals with times shorter than the time it takes for the collimator to move from the top position to the bottom position to cover the slice.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

It should be noted herein that any feature or component described in association with a specific embodiment may be used and implemented with any other embodiment unless clearly indicated otherwise.

FIG. 1A illustrates an X-ray system comprising an X-ray source 110 and a detector array 120 scanning a railcar 130 containing cargo 140. X-ray path 150 represents the non-interacting X-rays that are transmitted through the cargo 140. In an ideal system, these would be the only X-rays that would be detected. X-ray paths 160 represent X-rays scattered by the walls of the railcar container 130, and X-ray paths 170 represent X-rays scattered within the cargo 140. The scattered X-rays represented by paths 170 constitute background noise for the X-ray system. In various embodiments, the present specification provides systems and methods to reduce the background noise.

FIG. 1B illustrates a collimator coupled with a detector array for reducing the X-ray scatter signal. In FIG. 1B a detector collimator 180 is coupled with the array of X-ray detectors 120 for reducing the scattered X-rays (such as X-rays 170 shown in FIG. 1A). As shown, the path of the primary X-ray beam 190 does not interact with the collimator 180 and is detected by the detector array 120, while X-rays following path 192 are absorbed in the collimator 180 and not detected. Also, X-rays following path 194 go through collimator 180 and are detected by detector array 120, while X-rays following path 196 scatter in collimator 180 into the detector array 120 and are also detected.

These effects show that collimators reduce scatter, however, deeper collimators, or collimators that have a longer source to detector distance, result in higher rejection. The performance of the collimator is affected by the ratio of length to width of the individual collimator openings. The higher the ratio of length to width, the better the scatter rejection of the collimator; however, such an embodiment is more expensive to manufacture.

Further, as the collimator is made deeper, scatter in the collimator limits the rejection. Thus, there is a trade-off between using a deep collimator and achieving scatter reduction as the X-rays that scatter in the collimator (which is used to reduce scatter from the cargo) may become greater in number than the left-over scatter from the cargo. In an embodiment, collimator depth is maximized at 300 mm, after which depth, gain is minimized. It should be noted that the collimator wall thickness cannot be made too thick as it would reduce the number of unscattered X-rays. Thus, in order to reduce X-ray scatter, a greater number of collimator panes is employed.

Figure 2:
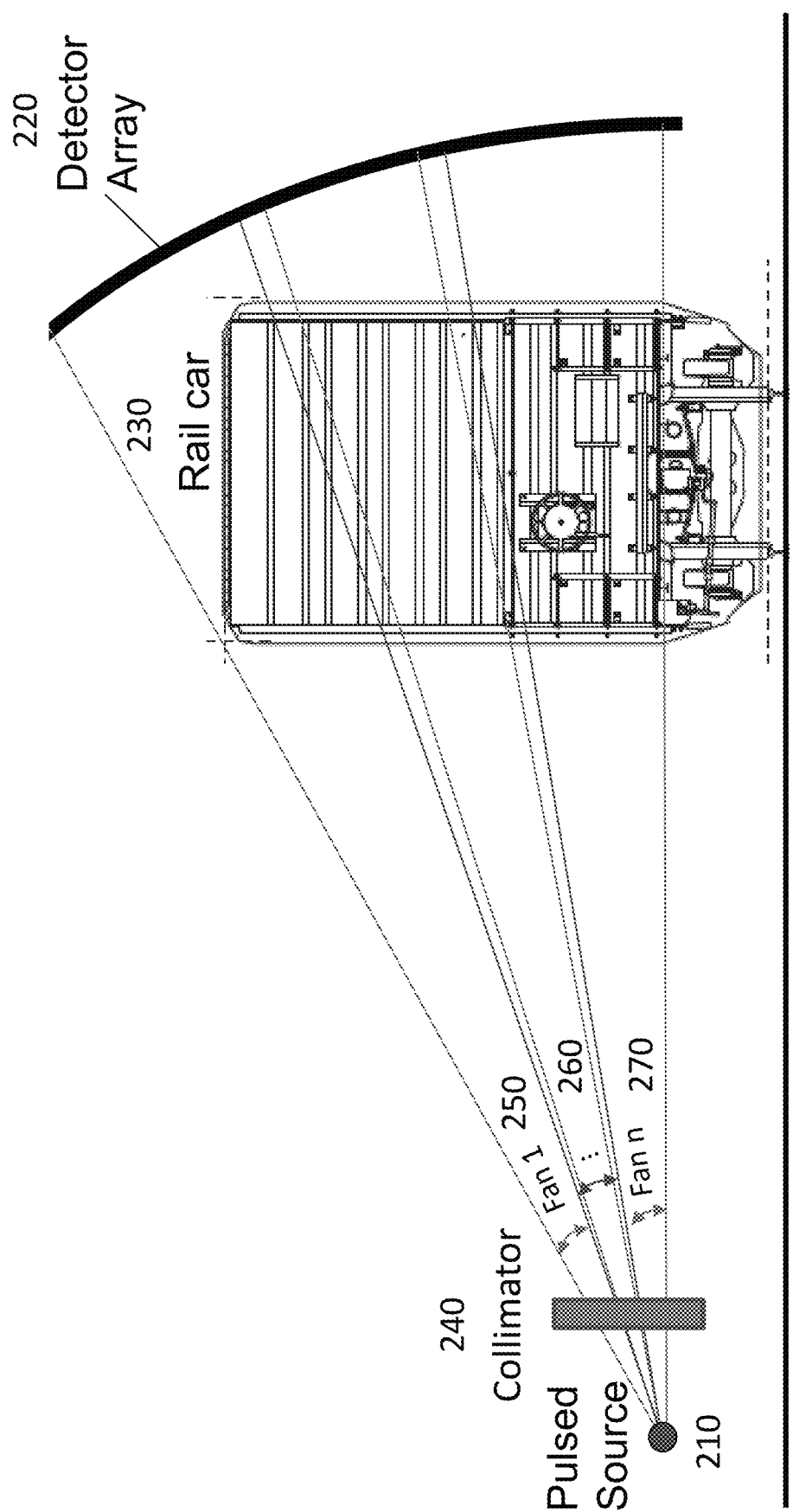
FIG. 2 illustrates a system comprising pulsed-source projecting vertically-moving fanlets for scanning cargo resulting in reduced scatter, in accordance with an embodiment of the present specification.

The present specification, in an embodiment, provides a method of reducing X-ray scatter signal by generation of a vertically moving X-ray beam or fanlets. FIG. 2 illustrates a system comprising a pulsed source projecting vertically-moving fanlets to scan a cargo with reduced scatter, in accordance with an embodiment of the present specification. The system comprises a pulsed X-ray source 210 for scanning a railcar (or other object) 230 and a detector array 220. Examples of suitable X-ray sources include, but are not limited to, electron linac hitting a tungsten target and CW sources such as Rhodotron and superconducting linac. One of ordinary skill in the art would appreciate that any pulsed X-ray source known in the art may be employed. Collimator 240 represents a mechanism that produces a vertically moving fan beam or fanlets 250, 260 and 270, with an angular range smaller than the angular coverage of the railcar 230.

Referring back to FIG. 2, the signal produced by fanlet 260 has reduced scatter compared to the full fan-shaped X-ray beam that is generally used to inspect cargo in conventional systems. In an embodiment, the X-ray pulses and the scanning mechanism are synchronized to collect data when the fan beam(s) are projected to fanlet positions 250, 260 and 270 to cover the vertical extent of the cargo railcar 230 in one cycle. A processing unit combines the data from the fanlets 250, 260, 270 to form an image of a slice of the cargo railcar 230. As the collimator defines the fanlet and tends to produce a beam with fuzzy edges, a small overlap between the fanlets 250, 260, 270 is preferred to allow for better "stitching" of the fanlets 250, 260, 270 into a slice image to eliminate or minimize edge effects. In an embodiment, an overlap of approximately 1 degree is employed. It may be noted that any suitable approach known in the art may be employed for stitching together the image slices.

In an embodiment, in order to reduce the effect of cargo motion, the source pulsing frequency is increased approximately in proportion to the number fanlets. For example, in a mobile application, the pulsing frequency is about 100 Hz. If the number of fanlets is 3, the frequency would be increased to 300 Hz. In an embodiment, the smallest number of fanlets is produced by dividing the corresponding fan beam in half; however this does not provide a significant reduction in scatter. By increasing the number of fanlets, which is achieved by decreasing the angular range of each fanlet, scatter radiation is decreased. However, an increased number of fanlets can only be obtained by proportionately increasing the pulsing frequency for a pulsed Linac source.

In an embodiment, a typical angular range for a fan beam for a scanner is approximately 60 degrees. In an embodiment, the angular range of a fanlet ranges from 1 degree to 30 degrees. In an embodiment, ten fanlets are employed, each having an angular range of 5 degrees. One of ordinary skill in the art would appreciate that a fanlet has a considerably larger angular range than a conventional pencil beam, which is on the order of a fraction of a degree.

The X-ray dose to cargo and the environment does not increase, because the total number of X-rays is the same as compared to a standard X-ray scan. However, the scatter is reduced as there are fewer X-rays inspecting the cargo at any acquisition time relative to the primary beam incident on the detectors.

For dual-energy scanning, the source may be either interlaced (meaning at a first pulse, a first energy, at a second pulse a second energy, and at an nth pulse an nth energy) or may contain both energies in the same pulse separated by a small time gap (>~100 ns). In this way, the frequency is effectively increased by a factor of two. For example, in a standard system operating at 250 Hz, the source emission frequency may be increased to 375 Hz with a dual-energy per pulse, resulting in an effective frequency of 750 Hz, enabling the use of three fanlets with small cargo motion effects.

In an embodiment, for interlaced dual-energy scanning, an odd number of fanlets are generated so that the second energy is at the same fanlet location in the following cycle to allow for dual-energy scanning of every vertical position. For example, in the case of three fanlets, in the first cycle, the following pattern would be seen: Top Fanlet having High Energy (HE), Center Fanlet having Low Energy (LE), and Bottom Fanlet having High Energy (HE). In the subsequent cycle, the following pattern would be seen: Top Fanlet having Low Energy (LE), Center Fanlet having High Energy (HE), and Bottom Fanlet having Low Energy (LE). Thus, in an embodiment, the first cycle is HE-LE-HE and the following cycle is LE-HE-LE, thereby allowing interlacing energy for the corresponding fanlet positions for consecutive cycles. It may be noted that if the number of fanlets is even, then the energy at each position would be either LE or HE, and arrangements of LE-HE or HE-LE for the same vertical position will not be possible.

Figure 3:
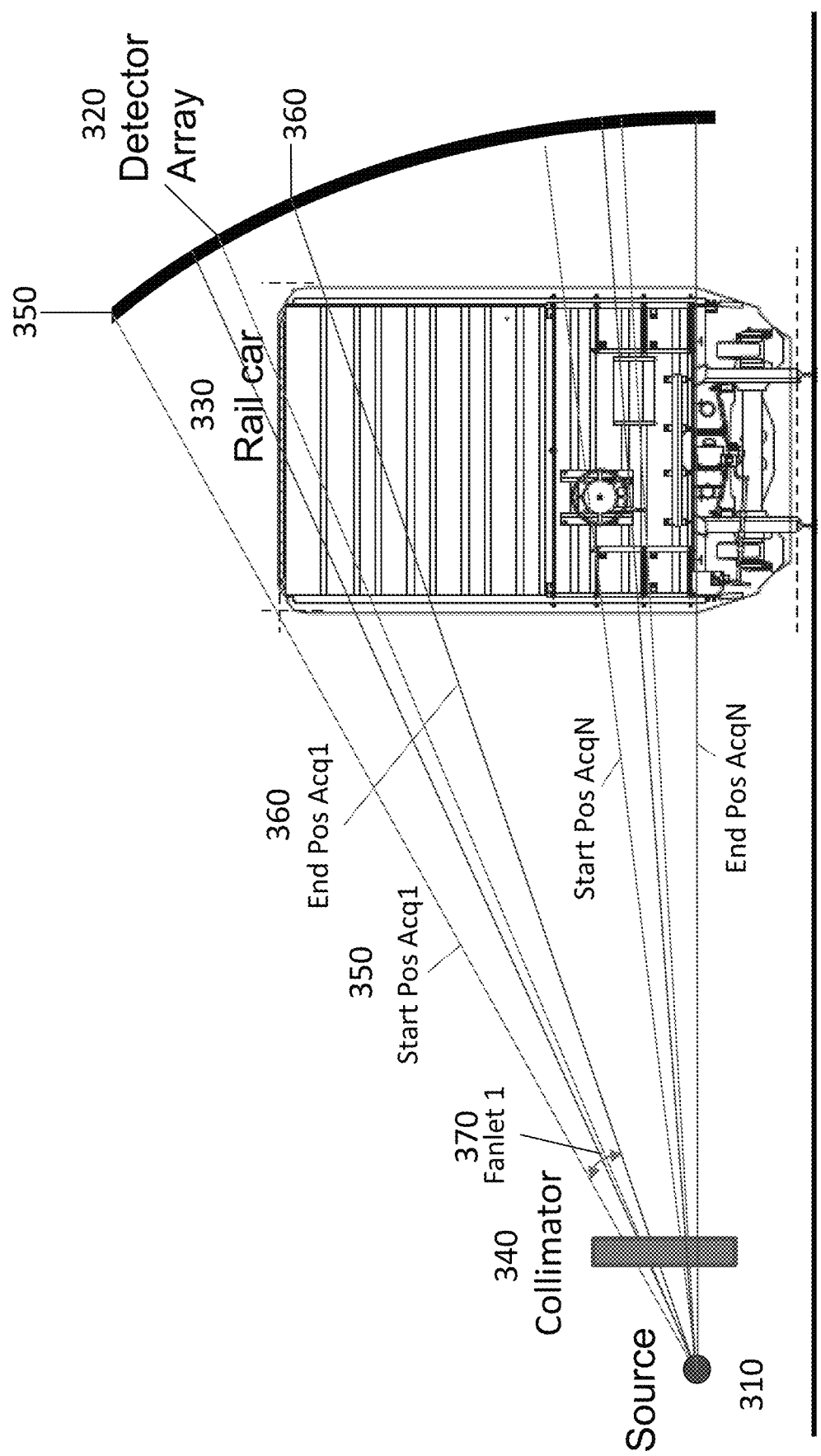
FIG. 3 illustrates a system comprising a continuous wave (CW) source projecting vertically continuously-moving fanlets to scan a cargo resulting in reduced scatter, in accordance with another embodiment of the present specification.

FIG. 3 illustrates a system comprising a CW source projecting continuously-moving fanlets, in a vertical motion, to scan cargo with reduced scatter, in accordance with another embodiment of the present specification. FIG. 3 illustrates an X-ray system comprising a CW X-ray source 310 and a detector array 320 scanning a cargo railcar 330. Collimator 340 represents a mechanism that produces a vertically continuously moving fan beam with an angular range smaller than the angular coverage of the railcar 330. The scanning mechanism is synchronized with a data acquisition module to start data collection at the detector array 320 in position 350 and end data collection at position 360 to cover an angular range of fanlet 370. In FIG. 3, the end position 360 constitutes the start position of the next acquisition cycle. The data collection continues in similar fashion until the full vertical extent of the cargo is covered by the "individual" fanlets. As in the pulse-source embodiment shown in FIG. 2, the scatter is reduced by using the CW source 310. It may be noted that the operation of the system remains the same regardless of whether the source is pulsed or CW. While a pulsed high energy x-ray source produces a pulse of a few microseconds separated by few milliseconds, a CW source continuously produces X-rays.

Figure 4:
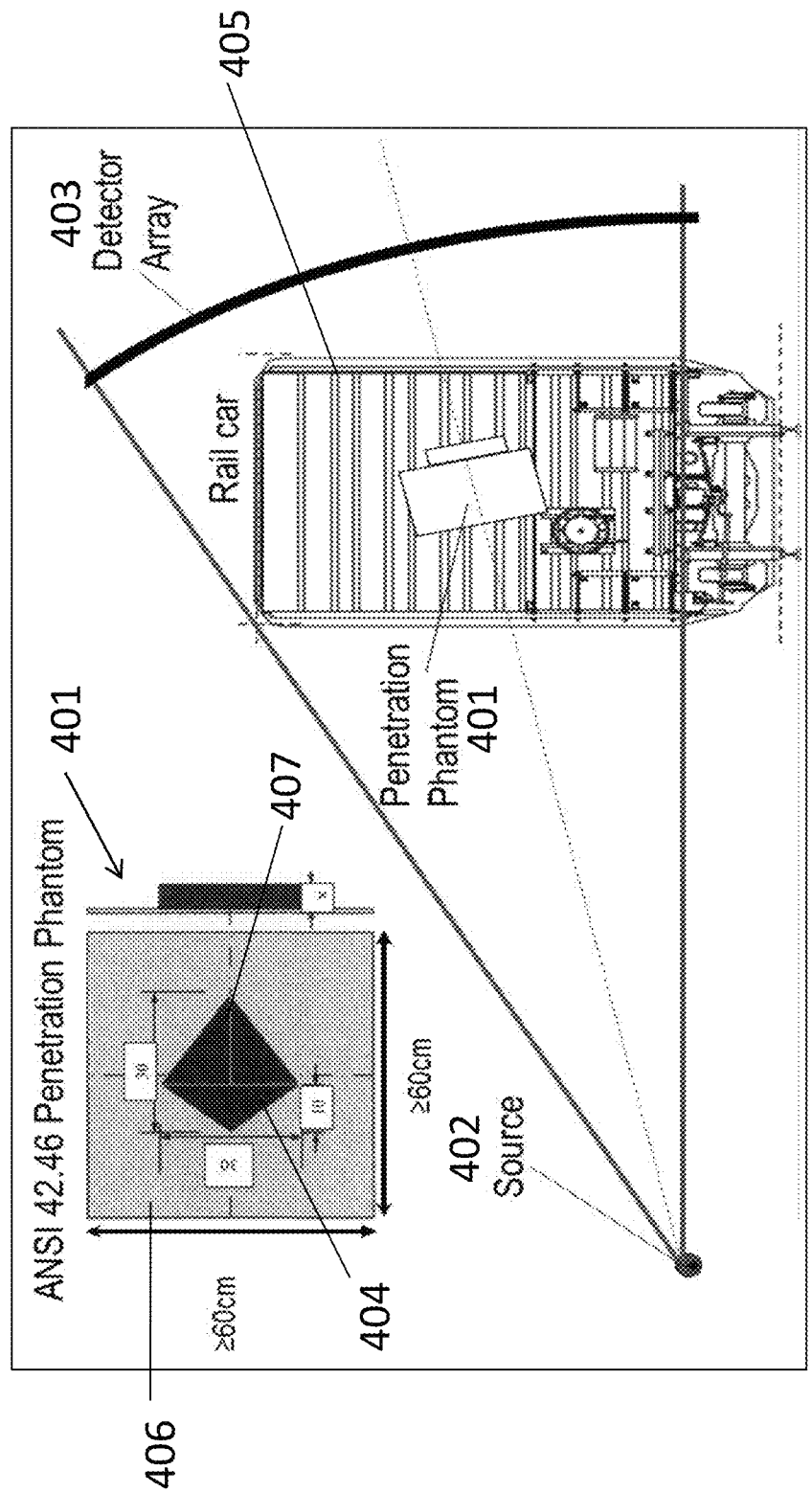
FIG. 4 is an exemplary illustration in which the imaging system of the present specification is used for scanning a standard penetration phantom object.

FIG. 4 is an exemplary illustration in which the imaging system of the present specification is used for scanning an ANSI 42.46 standard penetration phantom object. As shown in FIG. 4, an ANSI 42.46 penetration phantom object 401 is placed inside a rail-cargo 405. The ANSI 42.46 standard penetration phantom object 401 is used for assessing the penetration capability of high-energy radiographic systems. Said object 401 comprises a rectilinear iron block 406 having a length and a width of at least 60 cm each; and an iron block 404 of an approximate rhomboidal shape placed behind the rectilinear block 406. The thickness of the rhomboidal block 406 is approximately 20% of the thickness of the rectilinear block 406. In the testing procedure shown in FIG. 4, the phantom object 401 is placed at the center of a rail-cargo container 405 tilted towards the X-ray source 402. An array of X-ray detectors 403 is set up to detect the X-rays transmitted through the object 401. A successful ANSI test of penetration for an X-ray system is based on assessing the capability of that X-ray system in determining the direction in which a tip 407 of the rhomboidal object 406 points in the captured image.

Figure 5:
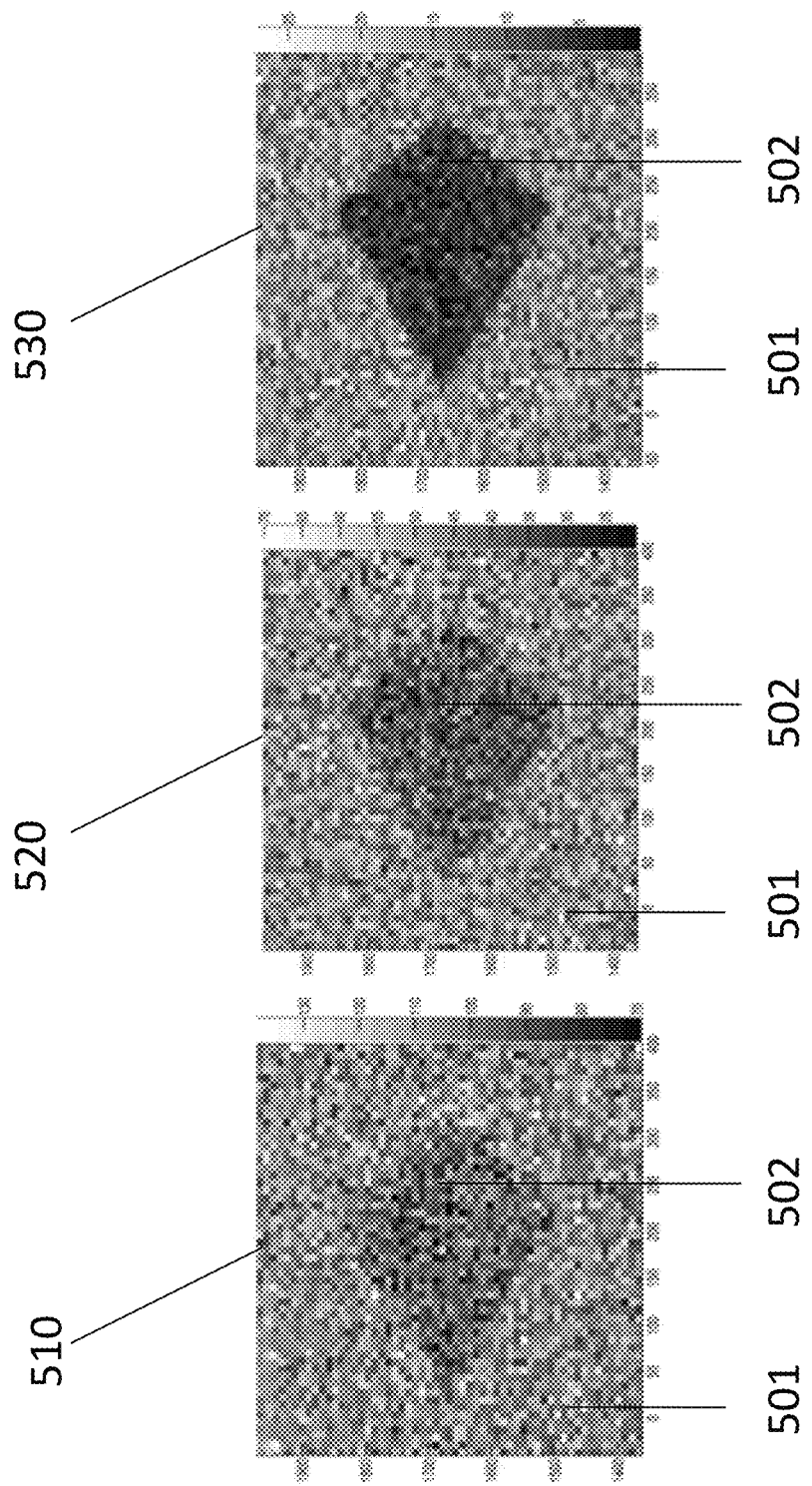
FIG. 5 illustrates exemplary simulated images for standard penetration phantom objects obtained with a full fan beam of X-rays and multiple fanlets via the imaging system described in FIG. 4, in accordance with an embodiment of the present specification.

FIG. 5 illustrates exemplary simulated images for ANSI 42.46 penetration phantom objects obtained with a full fan beam of X-rays and with the use of multiple fanlets via the imaging system described in FIG. 4, in accordance with an embodiment of the present specification. Image 510 is formed by irradiating the phantom object (such as object 401 shown in FIG. 4) comprising a rectilinear object coupled with a rhomboidal shaped object, with a full fan beam. As can be seen, the image quality of image 510 is poor as it is difficult to distinguish the rhomboidal shaped object 502 within rectilinear object 501 in this image. Image 520 is obtained by irradiating the phantom object (such as object 401 shown in FIG. 4) by using multiple fanlets of X-rays such as described with reference to FIG. 4. Using multiple fanlets, the image contrast is improved as less scatter is measured. As can be seen, the image quality of image 520 is better as the rhomboidal shaped object 502 within rectilinear object 501 is better visible as compared to the image 510. Image 530 is obtained by irradiating the phantom object (such as object 401 shown in FIG. 4) by using a larger number of fanlets of X-rays than used to obtain image 520. By using a larger number of fanlets, even a lower number of scattered X-rays are detected. As can be seen from the figure, the quality of image 530 is better than that of image 520 as the rhomboidal shaped object 502 within rectilinear object 501 is most clearly visible in image 530.

The production of vertically moving fanlets of X-rays requires a system for projecting an X-ray beam with an angular range smaller than the angular coverage of the object being inspected. In one embodiment, the system comprises a radiation source that emits radiation at an emission rate ($R_e$) and a conveyor that moves an object through the system at a conveyor rate ($R_c$), where the time ($T_f$) for a fanlet to traverse the object is preferably equal to the time for a single radiation pulse. In such a case, the total amount of time for a set of fanlets (which, when combined, cover the entire angular range encompassing the object) to be emitted is equal to times the total number of fanlets ($N_f$): $T_f*N_f$. That total time, when multiplied by the conveyor rate ($R_c$), should preferably be equal to or less than a detector width ($D_w$), thereby insuring no portion of the object is missed. Therefore:

$T_f*N_f*R_c \leq D_w$, where $T_f$ is the time for one fanlet, $N_f$ is the total number of fanlets, $R_c$ is the conveyor speed, and $D_w$ is the detector width. Various embodiments for producing vertically-translated fanlets are described below.

Figure 6A:
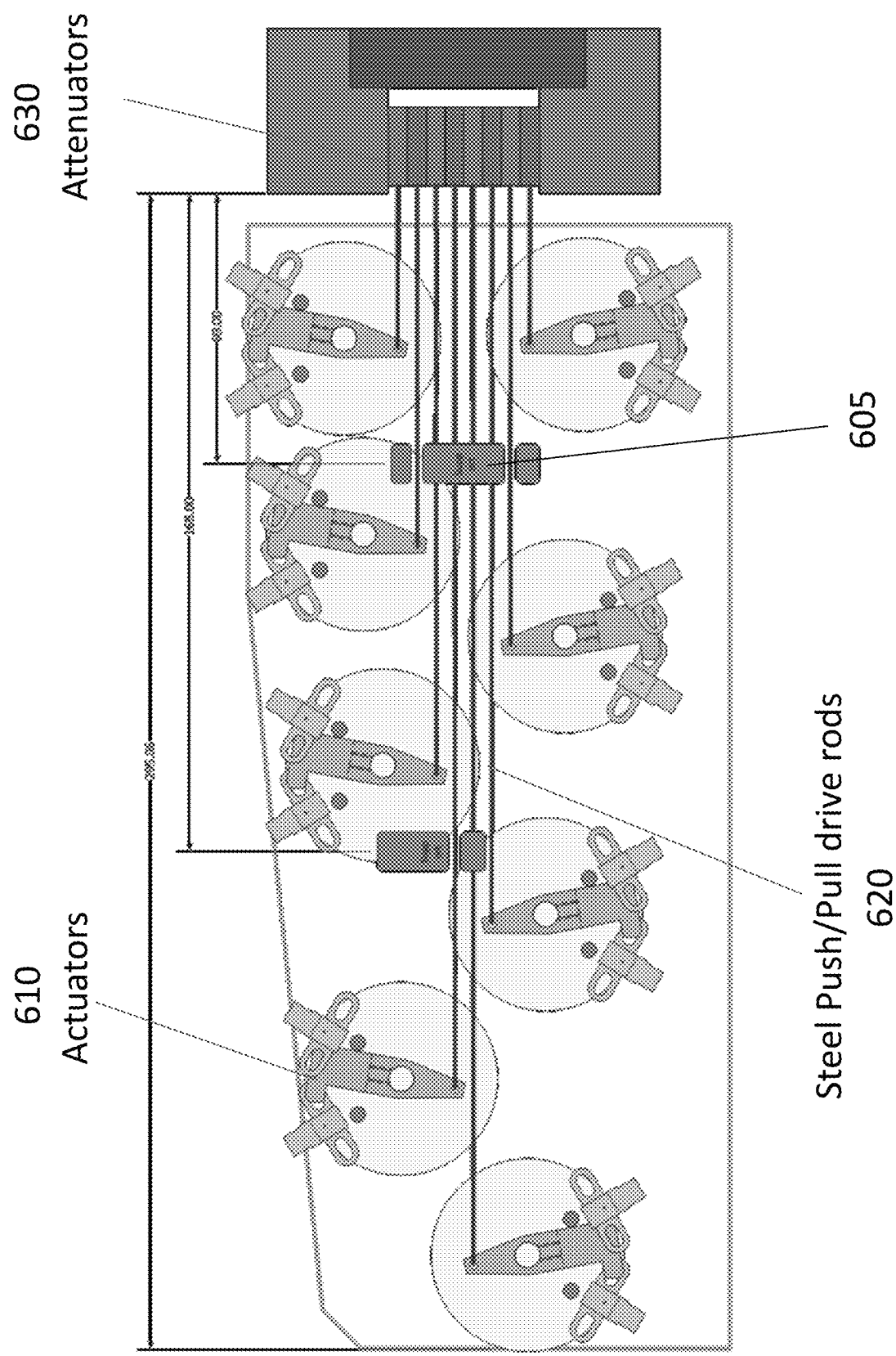
FIG. 6A illustrates a mechanism comprising multiple actuators connected to beam attenuators to produce vertically-moved fanlets, in accordance with a preferred embodiment of the present specification.

FIG. 6A illustrates a mechanism comprising multiple actuators connected to beam attenuators to produce vertically-moved fanlets, in accordance with a preferred embodiment of the present specification. A plurality of actuators 610 connect to a plurality of beam attenuators 630 through steel push/pull drive rods 620. The actuators 610 are computer-controlled to move the beam attenuators 630 to attenuate the beam to project vertically moved fanlets, as described in more detail in FIG. 6B. In an embodiment, the actuators 610 are rotary actuators for obtaining a fast response time for scanning fast moving objects. In alternate embodiments for deep scanning which includes scanning slow moving or stationary objects, other types of actuators such as pneumatic actuators may be used.

In an embodiment, for performing a deep scan, a single fanlet having an angular range sufficient to cover the object's area of interest is used. In cases where a large part of a cargo being scanned is highly attenuating, and scanning the same at a low speed is possible, X-ray fanlets such as described above are used to scan the cargo. However, the speed of scan is maintained lower than that used for scanning a fast moving cargo. In an embodiment, the number of fanlets used for scanning the cargo at a slow speed is greater than that used for scanning a fast moving cargo.

For example, and by way of example only, at a pulsing frequency of 1 KHz, a Linac source produces 1 X-ray pulse every 1 millisecond (1/1000 Hz=1 ms). While scanning an object moving at 3.6 km/h (or 1 mm in 1 ms or 1 mm per pulse), by using a detector having a width of 10 mm, the entire object is covered by the X-rays because the detector is wider than the distance moved by the object per pulse. Hence, the maximum number of fanlets that can be used to scan the object without missing any part of the object is 10, as it takes 1 ms per fanlet, which if multiplied by 10 fanlets=10 ms, meaning 10 mm of distance travelled by the object, which is equal to the detector width. However, if the number of fanlets is increased, for example to 20 fanlets, the time it would take the fanlets to cover the object would be 20 ms, which means the object also moves by 20 mm. Since the detector width is only 10 mm, a part of the object would be missed by the X-rays. However, if the speed of the object is lowered to 1.8 km/h, the object moves 10 mm in 20 ms, thereby allowing every part of the object to be scanned. Accordingly, in one embodiment, the system monitors whether the total fanlet time, when multiplied by the conveyor rate ($R_c$), is greater than a detector width ($D_m$). If the system determines that it is, the conveyor rate is ($R_c$) is decreased to a rate sufficient to insure that the total time, when multiplied by the conveyor rate ($R_c$), is equal to or less than a detector width ($D_w$).

Figure 6B:
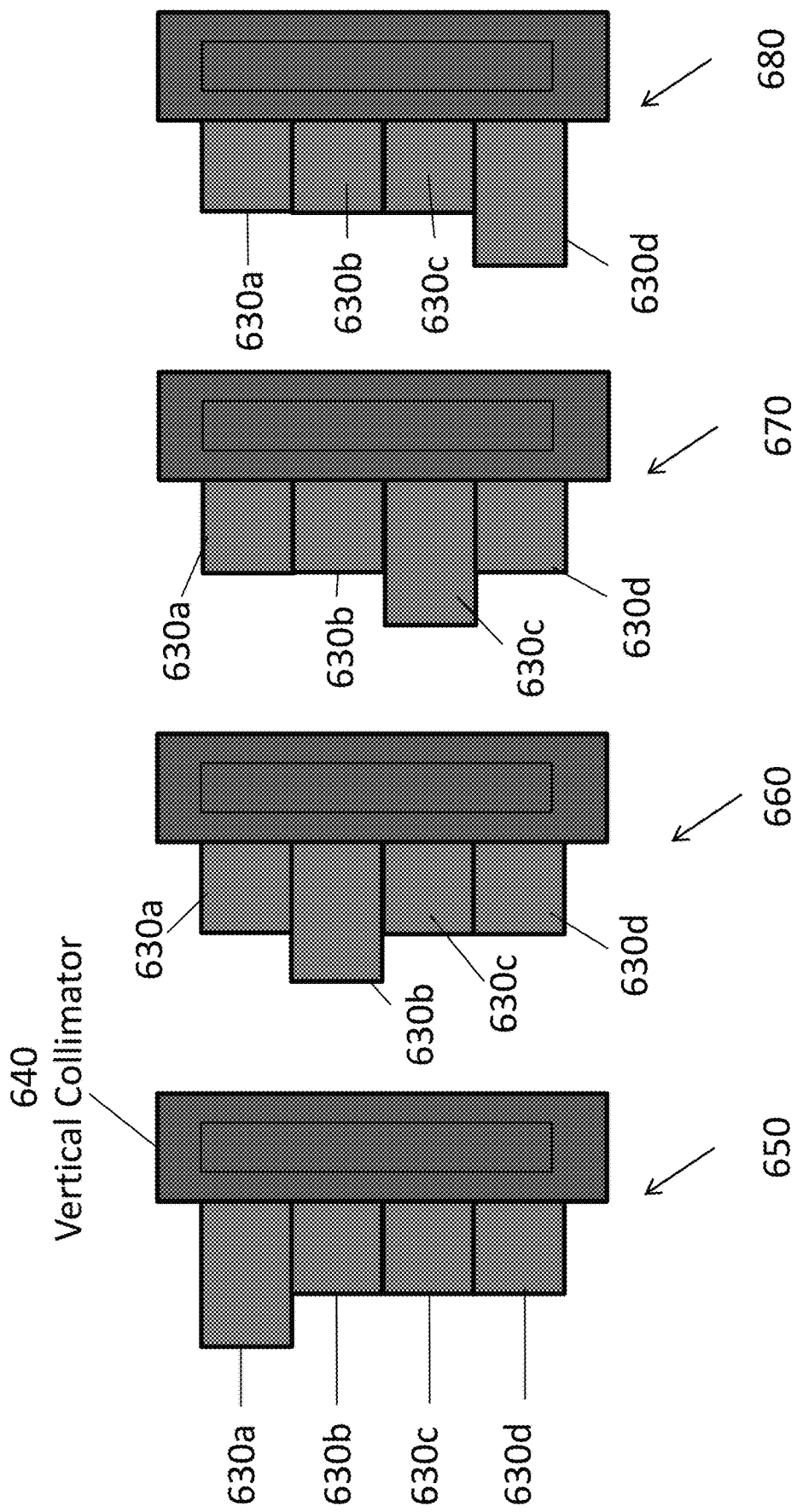
FIG. 6B is a block diagram illustrating various attenuator configurations within the mechanism for producing the vertically-translated fanlets shown in FIG. 6A, in accordance with a preferred embodiment of the present specification.

FIG. 6B is a block diagram illustrating various attenuator configurations in the mechanism to produce vertically-moved fanlets shown in FIG. 6A. As shown in FIG. 6B, a vertical collimator 640 is coupled with a plurality of beam attenuators 630a, 630b, . . . , 630n, which in turn are connected to a plurality of actuators (not shown in FIG. 6B) as shown in FIG. 6A. The vertical collimator 640 projects a fan beam that covers the complete vertical extent of the object being scanned. The plurality of attenuators 630a, 630b, . . . , 630n may be controlled by means of the rods 620 coupled with actuators 610, to move in and out of the projected beam to project X-ray fanlets that move vertically with respect to the object being scanned. In the configuration 650, attenuators 630b, 630c and 630d are moved into the beam to attenuate the beam, while attenuator 630a stays out of the beam to project a fanlet over an upper part of the object being scanned. In the configuration 660 attenuators 630a, 630c and 630d are moved into the beam to attenuate the beam, while attenuator 630b stays out of the beam to project a fanlet over an upper middle part of the object being scanned. In the configuration 670 attenuators 630a, 630b and 630d are moved into the beam to attenuate the beam, while attenuator 630c stays out of the beam to project a fanlet over a lower middle part of the object being scanned. In the configuration 680 attenuators 630a, 630b and 630c are moved into the beam to attenuate the beam, while attenuator 630d stays out of the beam to project a fanlet over a lower part of the object being scanned. Hence, the fanlet is moved to project X-rays over different parts of the object being scanned by moving an attenuator out of the X-ray beam being projected. The movement of the attenuators as described provides vertically moving X-ray fanlets. In various embodiments, the beam attenuators 630a, 630b, . . . , 630n are made of high-density materials such as but not limited to lead or tungsten.

Figure 7:
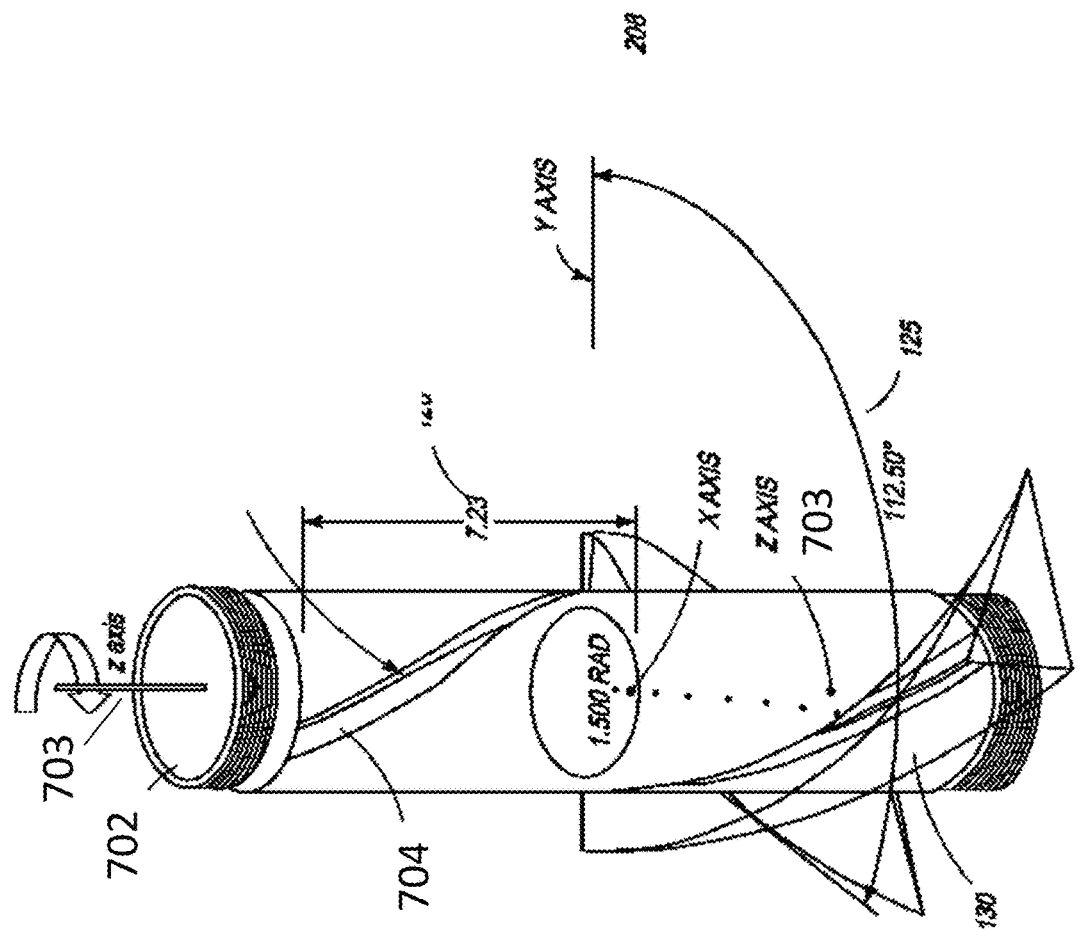
FIG. 7 illustrates an exemplary design of a spin-roll chopper used for moving X-ray fanlets vertically with respect to an object being scanned, in accordance with an alternate embodiment of the present specification.

In another embodiment X-ray fanlets may be moved vertically with respect to an object being scanned by means of a helical profile aperture formed on a rotating cylinder. FIG. 7 illustrates an exemplary design of a spin-roll chopper being used for moving X-ray fanlets vertically with respect to an object being scanned, in accordance with an alternate embodiment of the present specification. The spin-roll chopper is described in U.S. Pat. No. 9,058,909 B2, which is incorporated herein by reference in its entirety. The rotation of the spin roll/beam chopper provides a vertically moving fanlet of constant size and velocity.

Beam chopper 702 is, in one embodiment, fabricated in the form of a cylinder made of a material that highly attenuates X-rays. Beam chopper 702 comprises helical chopper slits 704. The cylindrical shape enables the beam chopper 702 to rotate about a Z-axis 703 and along with the helical apertures 704, create a spin-roll motion, which provides an effective vertically moving aperture 704 that may project a vertically-moving fanlet of X-rays onto an object being scanned. In one embodiment, slits 704 are wide enough to allow a fanlet beam to be projected, as required by the system of present specification. It may be noted that narrow slits would produce a pencil beam and not a fan or fanlet beam.

FIG. 8a shows an exemplary mechanism for generating moving fanlets, according to another alternate embodiment of the present specification. Referring to FIG. 8a rotating mechanism 800 comprises a wheel 801 with three slits 802, 803 and 804, which are in the shape of an arc or a partial circle. In one embodiment, the wheel is made of a material highly attenuating for X-rays, such as lead or tungsten. Wheel 801 further comprises a vertical collimator 805. In operation, as the wheel is rotated, the intersection of a slit 802 and the vertical collimator 805 results in the blocking of the radiation from the slit, except for a section 806a that projects a fanlet. In one embodiment, the width of the slit is configured to produce the desired fanlet angular extent. In one embodiment, the rotating frequency of the wheel is determined based on the fanlet width and linac pulsing frequency. The wheel rotation is synchronized with the linac pulsing frequency to generate fanlets with little overlap and cover the cargo extent in one cycle.

FIGS. 8b, 8c and 8d are a series of figures illustrating various positions of the wheel to indicate how the fanlets are produced and move to cover the extent of an object being scanned. Referring to FIGS. 8b, 8c and 8d, along with FIG. 8a, position 810 shows the fanlet 806a in the upper most location. When wheel 801 is rotated in a counterclockwise direction, the fanlet 806b moves downwards as shown by position 820 in FIG. 8b. One of ordinary skill in the art would appreciate that the wheel may be rotated in clockwise direction as well. Thus, with further rotation after position 820, the fanlet 806c moves further down as shown in position 830 in FIG. 8c. When the fanlet exits the lowest position, the next slit 803 in the wheel projects the upper fanlet 807. This is shown as position 840 in FIG. 8d. The cycles of rotation are repeated until the complete object is scanned.

It may be noted that while the utilization of fanlets for scanning reduce the scatter, but there is still some scatter produced by the cargo interacting with the x-ray beam within the fanlet. Therefore in one embodiment, the system of the present specification measures the scatter with the detectors outside the fanlet and uses this measurement to estimate the scatter in the fanlet. The estimated scatter is then subtracted from the transmission image data to increase contrast of the resultant image.

One of ordinary skill in the art would appreciate that even with the increased penetration provided by the embodiments of the present specification, there would be dark alarms that may require manual inspection which is labor intensive. Therefore, in another embodiment, the present specification describes a method for scanning an object that employs a two-step process to further reduce dark alarms. This process is illustrated by means of a flow chart in FIG. 9.

Figure 9:
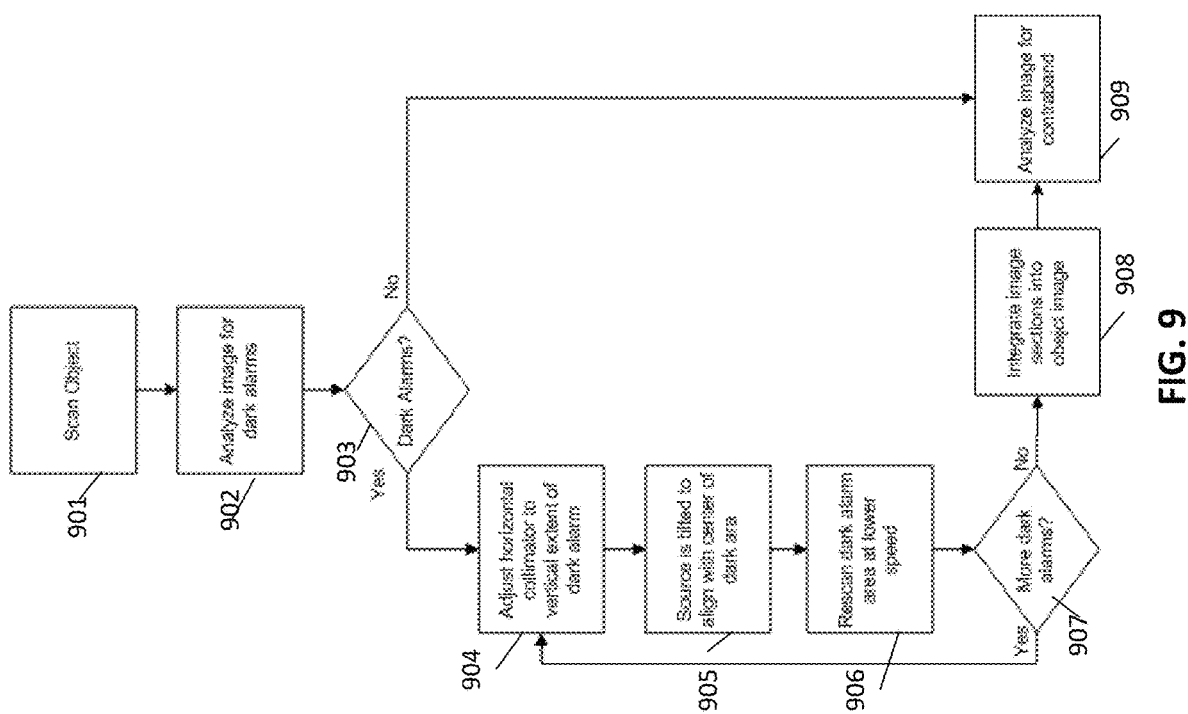

Referring to FIG. 9, in the primary scan 901, a truck or cargo container is scanned with a standard fan beam or fanlets of single or multi-energy high-energy radiation, where the transmitted radiation is measured with an array of detectors. In an embodiment, the truck or cargo container is scanned through a complete cycle, wherein a complete cycle is a scan of the vertical extent of the object under inspection using a standard fan beam having an angular range or a plurality of fanlets having a total angular range of a standard fan beam, as described above. Thus, in an embodiment, the fanlet, via collimator mechanics, is translated vertically to cover the angular spread of the object in a complete cycle. A pulsed linac X-ray source and a data acquisition system are synchronized with the moving collimator in such a way that the image of the object is acquired at intervals, where in one cycle the fanlets cover a slice of the object with no gaps and, optionally, a minimal overlap. The image from each fanlet is then combined to produce a slice image.

The transmission information is analyzed in step 902 to determine areas of dark alarm. If no areas of dark alarm are found (903), then the transmission image is analyzed to determine the presence of contraband and other items of interest, as shown in 909.

If one or more areas of the image are not penetrated by the beam (dark alarm), the areas are subjected to a secondary scan, as shown in step 903. In the secondary scan, a horizontal collimator is adjusted to only cover the vertical extent of the dark area, and suspect areas, if any. This is shown in 904. The container is then repositioned to allow the location of suspect area to be rescanned. In one embodiment, the radiation source is tilted to align with the center of dark area, as shown in 905. In one embodiment, the rescan is preferably performed at a lower speed than the primary scan, such as for example at $1/40^{th}$ of the standard scanning speed. This is shown in 906.

In one embodiment of the system, the source and detectors are mounted on a gantry that allows repositioning the system and scanning any part of the object with a wide range of speeds. Optionally, the source is tilted in such a way that the beam center line is aligned with the center of the dark areas to increase the beam intensity, since the Bremsstrahlung x-rays are more intense.

The reduction of the vertical extent by suitably using a collimator prevents scatter from other areas of the container and increases penetration. It may be noted that scatter reduction also helps improving material separation with dual-energy beams as the single-energy images are cleaner from the scatter that distorts the x-ray spectra. The lower scanning speed further allows for improved statistical accuracy and also increases penetration.

Thereafter, the scanning system examines the transmission image again to check if there are any more dark alarms, as shown in 907. If more dark alarms are found in the scan image, a rescan is performed again, by repeating the steps 904, 905 and 906. This process continues until all dark alarms are resolved.

When there are no more dark alarms, the rescanned sections of the image are integrated into the original image of the object, as shown in 908. This is done, in one embodiment, by replacing the original sections of the image with corresponding rescanned sections. The transmission image is then analyzed to determine the presence of contraband and other items of interest, as shown in 909.

Another motivation for the secondary scan, in addition to clear dark alarms, is to clear automated high-Z alarms. It may be noted that the system of present specification uses automated programs to generate alarms when a high Z material is detected. This system and method of automatically generating alarms when a high Z material is detected is described in U.S. patent application Ser. No. 14/104,625, entitled "Systems and Methods for Automated, Rapid Detection of High Atomic Number Materials" and filed by the applicant of the present specification, which is incorporated herein by reference in its entirety.

It may be noted that the method for automatically detecting high Z materials employs attenuation information from the segmented objects and surrounding background. Therefore, rescanning suspect objects with lower scatter can resolve the alarm, as there is an improved single- and dual-energy contrast to reduce the need for active interrogation. Thus, in one embodiment, the system of present specification employs the rescan approach described above with reference to FIG. 9, to clear automated high Z alarms in a manner similar to clearance of dark alarms. In one embodiment, additional improvement is obtained by another scan performed at a 10-20° angle to allow for a different view of the cargo that would have a different set of superimposing objects. One of ordinary skill in the art would appreciate that the requirement of confirming an alarm in all stages of scan would result in an even lower false-alarm rate. Those skilled in the art would also appreciate that secondary inspection may be applied not only to high Z materials, but may be extended to other objects of interest as well, such as suspected contraband including explosives, firearms, drugs, etc.

In one embodiment, the X-ray source may be replaced with a neutron source. It may be noted that when the x-ray source is replaced with a neutron source, the detectors are replaced with neutron detectors and the collimators are replaced with neutron-attenuating materials instead of lead. However, the operation of the system remains the same.

In the description and claims of the application, each of the words "comprise" "include" and "have", and forms thereof, are not necessarily limited to members in a list with which the words may be associated.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. An X-ray detection system configured to provide for increased penetration of an object, comprising:
   an X-ray source for generating an X-ray beam in an inspection volume;
   a conveyor for moving the object through the inspection volume;
   a collimator positioned between the X-ray source and the object, wherein the collimator is configured to receive the X-ray beam and comprises a plurality of controlled fast actuators coupled with beam attenuators to shape the X-ray beam, thus producing one or more fanlets from the X-ray beam, and wherein each fanlet comprises a vertically moving fan beam having an angular range greater than 1 degree but smaller than the angular coverage of the object;
   a detector array opposing said X-ray source and positioned within the inspection volume for detecting the one or more fanlets projected on the object;
   a controller configured to synchronize the X-ray source and the collimator and collect image slices from the detector array corresponding to each of the one more fanlets and control the conveyor such that a total time for the one or more fanlets multiplied by a rate of speed of the conveyor is equal to or less than a width of a detector in the detector array; and
   a processing unit for combining the image slices collected into a composite image.

2. The system of claim 1 wherein the X-ray source is a pulsed X-ray source.

3. The system of claim 2 wherein the X-ray source is configured to produce dual-energy beams.

4. The system of claim 3 wherein the dual-energy beams are interlaced.

5. The system of claim 2 wherein the X-ray source is configured to produce X-ray pulses comprising low and high energy X-ray beams separated in time.

6. The system of claim 1 wherein the collimator is configured to generate an overlap between the one or more fanlets of approximately 1 degree.

7. The system of claim 1 wherein the X-ray source is a CW X-ray source.

8. The system of claim 1 wherein the collimator comprises a beam chopper.

9. The system of claim 1 wherein the collimator comprises a rotating wheel with slits designed to produce the vertically moving one or more fanlets.

10. An X-ray detection method comprising:
    irradiating an object with more than one X-ray fanlet, wherein each X-ray fanlet comprises a vertically moving fan beam having an angular range greater than 1 degree but smaller than the angular coverage of the object and wherein each X-ray fanlet is produced by using a collimator for collimating an X-ray beam generated by an X-ray source;
    synchronizing the X-ray beam and the more than one X-ray fanlet;
    detecting the more than one X-ray fanlet irradiating the object;
    adjusting a beam intensity and energy of each of the more than one X-ray fanlet based on signals detected from a previous X-ray fanlet at a same vertical position with respect to the object to generate a control output;
    collecting image slices from the detector array corresponding to a complete scan cycle of the more than one X-ray fanlet; and
    processing the image slices and combining the image slices into a composite image.

11. The method of claim 10 wherein the X-ray source is a pulsed X-ray source.

12. The method of claim 10 wherein the X-ray source is configured to produces dual-energy beams.

13. The method of claim 10 wherein the dual-energy beams are interlaced.

14. The method of claim 10 wherein the X-ray source is configured to produces X-ray pulses comprising low and high energy X-ray beams separated in time.

15. The method of claim 10 wherein the collimator is configured to generate an overlap between the one or more X-ray fanlets at every position with respect to a surface area of the object.

16. The method of claim 10 wherein the collimator comprises a spinning cylinder with a helical aperture.

17. The method of claim 10 wherein the collimator comprises a plurality of controlled fast actuators coupled with beam attenuators to shape the X-ray beam.

18. The method of claim 10 wherein adjusting the beam intensity and the energy of each of the more than one X-ray fanlet based on signals detected from the previous X-ray fanlet at the same vertical position causes every vertical position to be subject to interlaced dual-energy scanning.

19. The method of claim 10 wherein the X-ray source is a CW X-ray source.

* * * * *